United States Patent [19]

Haws

[11] Patent Number: 5,021,153
[45] Date of Patent: Jun. 4, 1991

[54] COMBINED APPARATUS FOR REMOVING GRIT AND GREASE FROM SEWAGE

[75] Inventor: Ray C. Haws, La Porte, Tex.
[73] Assignee: G-H Systems, Inc., La Porte, Tex.
[21] Appl. No.: 439,851
[22] Filed: Nov. 20, 1989
[51] Int. Cl.⁵ .......................................... B01D 21/00
[52] U.S. Cl. ................... 210/221.2; 210/519; 210/521; 210/537
[58] Field of Search ............... 210/220, 221.2, 519, 210/521, 534, 535, 537, 522

[56] References Cited

U.S. PATENT DOCUMENTS

| | | | |
|---|---|---|---|
| 763,981 | 7/1904 | Hupchen | 210/221.2 |
| 1,253,653 | 1/1918 | Welsch | 210/221.2 |
| 1,440,832 | 1/1923 | Jones | 210/519 |
| 2,422,258 | 6/1947 | Prager | 210/220 |
| 2,669,440 | 2/1954 | Lindenbergh | 210/221.2 |
| 2,713,026 | 7/1955 | Kelly et al. | 210/221.2 |
| 2,713,027 | 7/1955 | Binford | 210/524 |
| 3,306,449 | 2/1967 | Minegishi | 210/207 |
| 3,353,676 | 11/1967 | Hirsch | 210/519 |
| 3,397,788 | 8/1968 | Duff et al. | 210/519 |
| 3,487,017 | 12/1969 | Thorn et al. | 210/537 |
| 3,659,720 | 5/1972 | Malm | 210/525 |
| 4,193,877 | 3/1980 | Lillywhite | 210/520 |
| 4,265,753 | 5/1981 | Manuel | 210/199 |
| 4,376,045 | 3/1983 | Siskind | 210/519 |
| 4,425,231 | 1/1984 | Fujimoto et al. | 210/96.1 |
| 4,526,687 | 7/1985 | Nugent | 210/205 |
| 4,670,142 | 6/1987 | Lowry | 210/207 |
| 4,834,872 | 5/1989 | Overath | 210/221.2 |

FOREIGN PATENT DOCUMENTS 522041 8/1920 France .
33200 2/1909 Sweden .

Primary Examiner—Stanley Silverman
Assistant Examiner—Christopher Upton
Attorney, Agent, or Firm—Daniel V. Thompson

[57] ABSTRACT

A combined apparatus for removing grit and grease from sewage includes a tank and a sewage inlet conduit extending into the tank. A mixing eductor receives incoming sewage and aeration is provided within the mixing eductor for upward flow. A down draft baffle outside the mixing eductor recives the aerated fluid and transports it downwardly to enable grit to settle out of the influent. The tank has a volume sufficient for settling substantially all grit from the influent sewage and separating substantially all grease.

17 Claims, 2 Drawing Sheets

COMBINED APPARATUS FOR REMOVING GRIT AND GREASE FROM SEWAGE

TECHNICAL FIELD

This invention relates to sewage treatment apparatus, and more particularly to a grit and grease removal system for sewage treatment plants, and the like.

BACKGROUND OF THE INVENTION

Grit and grease are constituents in incoming raw sewage that for best efficiency must be removed before subsequent treatment of the organic materials in sewage. Grit is defined as silica sand and other minerals having a specific gravity greater than one and being non-organic in nature. Grease, while organic in nature, is not amenable to biological treatment as normally employed and early separation of grease and oil facilitates efficient biological processing of the sewage.

Traditionally, a simple detention time gravity sedimentation unit has been used to separate grit as an initial step in treatment of incoming sewage. Grease has been removed downstream in primary clarifiers along with other floatables removed by scum skimmers.

The drawback of removing grease at the clarifier stage downstream of the traditional grit removal tank is that the grease causes severe problems in the service of the clarifiers. In general, grease is hard to remove, and the quicker it is removed from the system, the less trouble can be expected throughout the system.

Therefore, a need presently exists for a combined system which removes the undesirable and readily separable grit and grease as an initial step in sewage treatment.

SUMMARY OF THE INVENTION

The present invention is a system which enables a three-product separation, that is, the separation of grit and grease from incoming sewage flow. Influent coming into the tank is composed of water plus organic material and a substantial amount of inorganic material, primarily grit, and grease. The three products are separated and taken out of the system in three separate streams. Influent is introduced at the bottom of a tank and ejected upwardly into a mixing eductor. Air diffusers provide aeration in the mixing eductor to separate the grit and grease by agitation and provide the motive force to circulate the products through the tank. At the top of the mixing eductor, the aerated influent reverses flow to travel downwardly in an annular space between the mixing eductor and a down draft baffle. Flow through the down draft baffle exits at a lower end terminating in the vicinity of the lower end of the mixing eductor, such that some flow is recycled back up the mixing ejector. The remainder of the flow enters into the tank, where grit settles out and grease floats to the top. Relatively grit and grease free effluent is taken from a point below the surface.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION OF THE PREFERRED EMBODIMENT

Figure 1:
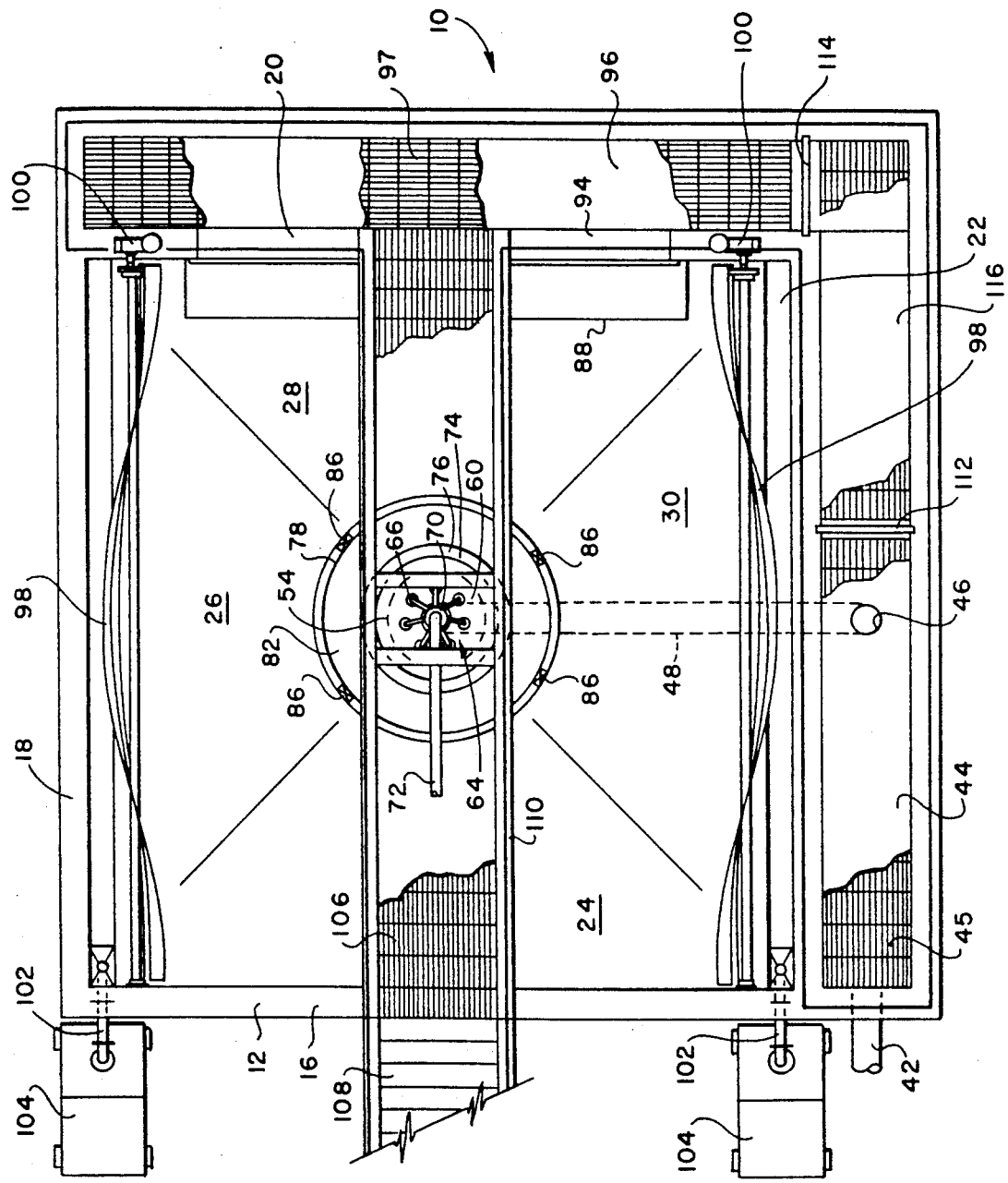
FIG. 1 is a schematic plan view of a system constructed in accordance with the invention.
Figure 2:
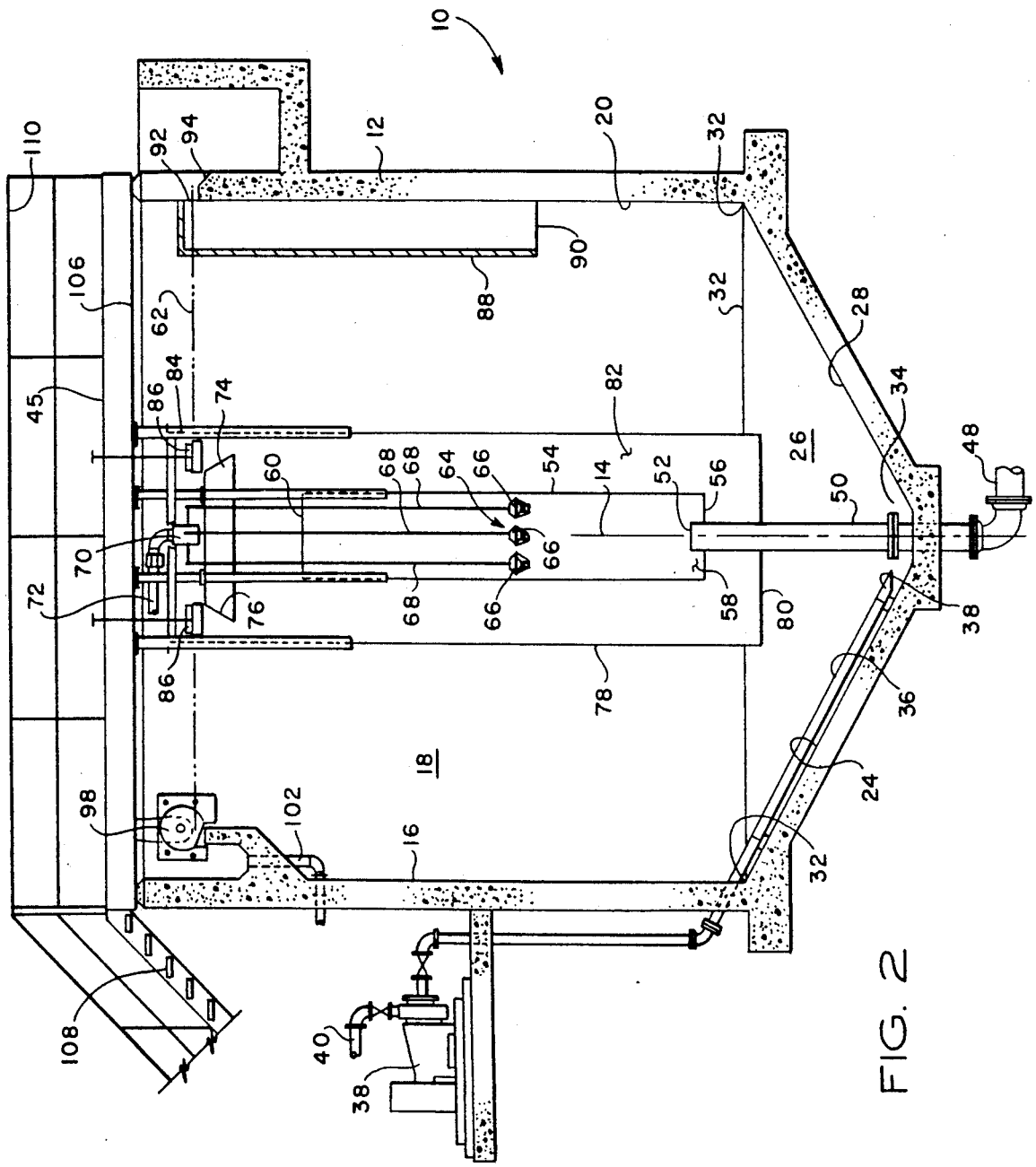
FIG. 2 is a schematic, partially broken away elevation view of the system of FIG. 1.

Referring to FIGS. 1 and 2, where like numerals indicate like and corresponding elements, a system 10 constructed in accordance with the present invention includes a tank 12 having approximately a square horizontal cross sections about a central axis 14 (FIG. 1). Tank 12 preferably includes four vertical planar side walls 16, 18, 20 and 22. Tank 12 further includes four planar bottom walls 24, 26, 28 and 30, sloping downwardly and inwardly from bottom edges 32 of the side walls to a central lower portion 34 located about central axis 14.

A grit slurry removal system (FIG. 2) includes a grit suction conduit 36 having a lower open end 38 located in central lower portion 34. Conduit 36 leads to grit pump 38, which has an outlet 40 leading to a grit cyclone (not shown).

The inlet system includes an inlet line 42 (FIG. 1) connected to an inlet channel 44 covered by grating 45. Inlet channel 44 leads to a downward flowing conduit 46 and then to a horizontal conduit 48. A portion of conduit 48, as well as other elements described below, are shown rotated 90 degrees in FIG. 2 for clarity. Sewage inlet conduit 50 is connected to conduit 48 and extends upwardly into tank 12 from central lower portion 34. Sewage inlet conduit 50 (FIG. 2) terminates at an open upper end 52 located at an elevation approximately corresponding to tank side wall bottom edges 32. Sewage inlet conduit 50 is coaxial with central axis 14.

A tubular mixing eductor 54 is coaxial with central axis 14 and has a lower open end 56 (FIG. 1) vertically located at an elevation approximately corresponding to sewage inlet conduit open upper end 52. Tubular mixing eductor lower end 56 has an opening greater in dimension than sewage inlet conduit 50 to define a recycle annular space 58 between tubular mixing eductor 54 and sewage inlet conduit 50. Mixing eductor 54 has an open upper end 60 vertically located at an elevation below a normal liquid surface elevation 62.

An aeration system includes an air diffuser drop assembly 64 composed of a plurality of air diffuser bodies 66 connected to conduits 68. Conduits 68 terminate at an air distribution manifold 70. Air supply line 72 extends between manifold 70 and a source of compressed air (not shown). Air diffuser drop assembly 64 is suspended within mixing eductor 54 at an elevation above recycle annular space 58 but below the normal liquid surface elevation 62.

A deflector baffle 74 is fixed above mixing eductor upper end 60 at an elevation approximately corresponding to normal liquid surface elevation 62. Deflector baffle 74 has downwardly and outwardly sloping frusto-conical wall 76 central with the central axis 14.

A tubular down draft baffle 78 is coaxial with central axis 14 and has a lower open end 80 (FIG. 2) vertically located at an elevation approximately corresponding to mixing eductor lower end 56. Down draft baffle lower end 80 has an opening greater in dimension than mixing eductor lower end 56 to define a down draft annular space 82 between down draft baffle 78 and mixing eductor 54. Down draft baffle 78 has walls 84 extending above normal liquid surface elevation 62, and a plurality of closable grease outlet openings 86 are located in down draft baffle walls 84 at normal liquid surface elevation 62.

Effluent scum baffle 88 is fixed to tank wall 20. Effluent scum baffle 88 includes an opening 90 located below normal liquid surface elevation 62 and a discharge opening 92 adjacent an effluent weir 94 leading to effluent channel 96. Grating 97 is provided over effluent channel 96.

A grease removal system includes a pair of spiral skimmers 98 located on opposed tank walls 18 and 22. Skimmer drive assemblies 100 operate in a conventional manner to remove floating grease at normal liquid surface elevation 62. Discharge conduits 102 lead to grease container and pump assemblies 104.

An access bridge 106 is provided to enable access to the centrally located components of the system, and includes access stairs 108 and hand rails 110.

Gates 112 and 114 and a bypass channel 116 are provided between influent channel 44 and effluent channel 96. Gates 112 and 114 are normally closed during operation of the system.

In operation, the system of the present invention efficiently removes both grit and grease from incoming sewage upstream of biological treatment units such as clarifiers and the like. Neither grit nor grease is readily treatable in subsequent treatment processes, and this system has the advantage of being able to simultaneously separate those contaminants and take them out of the basin in two separate streams. Incoming raw sewage travels upward through sewage inlet conduit 50 and is introduced into mixing eductor 54. Air diffuser drop assembly 64 aerates the influent, thereby providing agitation to separate the grit and grease. Typically, grease is attached to the grit particles, and the aeration and agitation washes grease and other organic materials off of the grit. Aeration also provides the motive force to circulate the influent through the tank.

Deflector baffle 74 helps turn the flow of violently agitated influent and deflect it down into down draft annular space 82 with minimal agitation at the surface. Down draft baffle 78 extends the detention time associated with the aeration process, and routes the aerated influent to lower open end 80 near the bottom of tank 12 to quickly settle the grit and provide a long rise path for grease in the large quiescent zone outside down draft baffle 78. Grit will settle rapidly in the typical situation, where the grit has a specific gravity greater than two. Grease separation requires additional time because grease is typically more nearly the weight of water.

A certain amount of aerated influent traveling downward in down draft annular space 82 will be recycled back into mixing eductor 54 through recycle annular space 58. The recycle rate is controlled by the amount of air added through air diffuser drop assembly 64.

Effluent is taken out of tank 12 at the lower opening 90 of effluent scum baffle 88 located approximately midway between the bottom of the tank and normal liquid surface elevation 62. Preferably, tank 12 is built in a square configuration so that straight line grease skimmers 98 can be utilized. Other tank and grease removal configurations are possible. Grease outlet openings 86 are provided to enable removal of excess grease accumulation in down draft annular space 82 but will be closed during normal operation.

An example system incorporating the present invention includes a tank having a volume of 8,000 cubic feet and a maximum flow of 2.2 MGD. The tank is square having side walls 12, 14, 16 and 18 twenty feet wide and eighteen feet tall. The sloping bottom walls 24, 26, 28 and 30 add another five feet of depth to the tank at the central lower portion 34 and have a one foot drop for each two feet of horizontal run. The normal liquid surface elevation 62 is two feet from the tops of the tank side walls. The air diffuser drop assembly 64 is submerged at a depth of twelve feet, mixing eductor upper end 60 is submerged a depth of four feet, and down draft baffle lower end 80 is submerged a depth of eighteen feet. Mixing eductor 54 has an outside diameter of 32 inches, and down draft baffle 78 has an outside diameter of 80 inches. Air is supplied to air diffuser drop assembly 64 at the rate of 132 SCFM, and the system has an HDT of 39 minutes.

Whereas, the present invention has been described with respect to a specific embodiment thereof, it will be understood that various changes and modifications will be suggested to one skilled in the art, and it is intended to encompass such changes and modifications as fall within the scope of the appended claims.

I claim:

1. Apparatus for removing grit and grease from sewage, comprising:

a tank having walls;

grit removal means disposed in said tank for transporting grit out of said tank;

a sewage inlet conduit extending into said tank for transporting sewage into said tank, said sewage inlet conduit terminating at an open end within said tank;

a mixing eductor having a lower end disposed to receive sewage from said sewage inlet conduit, and said mixing eductor having an open upper end vertically located above said mixing eductor lower end;

aeration means within said mixing eductor and vertically located between said mixing eductor lower and upper ends for violently agitating and transporting said sewage upwardly within said mixing eductor said aeration means including at least one air diffuser body connected to a compressed air conduit, and said aeration means constructed and arranged to provide agitation sufficiently violent to wash grease from grit in said sewage;

a down draft baffle greater in dimension than said mixing eductor walls and disposed to define a down draft annular space between said down draft baffle and said mixing eductor, and said down draft baffle having an upper portion disposed to receive aerated sewage from said mixing eductor upper end;

said tank having a volume about said down draft baffle sufficient for settling substantially all grit from said sewage and floating substantially all grease from said sewage;

effluent removing means for removing substantially grit and grease free effluent from said tank, said effluent removing means including an opening for receiving substantially grit and grease free effluent, with said opening being located below a normal liquid surface elevation; and grease removal means for transporting grease at said normal liquid surface elevation out of said tank.

2. The apparatus of claim 1 wherein said tank is symmetrical about a central axis and has a central lower portion, and said grit removal means is disposed in cooperating relationship to said tank central lower portion.

3. The apparatus of claim 2 wherein said sewage inlet conduit extends upwardly from said tank central lower portion coaxial with said central axis, terminating at an upper open end.

4. The apparatus of claim 3 wherein said sewage inlet conduit open end is located within said mixing eductor lower open end, with said mixing eductor lower end having an opening greater in dimension than said sewage inlet conduit open end to define a recycle annular space between said mixing eductor lower end and said sewage inlet conduit open end.

5. The apparatus of claim 4 with said mixing eductor lower open end vertically located at an elevation below said sewage inlet conduit open upper end.

6. The apparatus of claim 5 wherein said down draft baffle has a lower open end vertically located at an elevation below said tubular mixing eductor lower end.

7. The apparatus of claim 2 wherein said mixing eductor and down draft baffle are concentric tubular members coaxial with said central axis.

8. The apparatus of claim 7 wherein said sewage inlet conduit is a tubular member coaxial with said central axis.

9. The apparatus of claim 1 with said mixing eductor having an open upper end vertically located below an elevation approximately corresponding to a normal liquid surface elevation.

10. The apparatus of claim 9 comprising a deflector baffle fixed above said mixing eductor upper end, said deflector baffle having downwardly and outwardly sloping frustroconical walls, said frustroconical walls being disposed to downwardly deflect aerated sewage ejected from said mixing eductor upper end.

11. The apparatus of claim 10 with said down draft baffle having walls extending above said normal liquid surface elevation to contain aerated sewage for downward flow.

12. The apparatus of claim 11 with at least one grease outlet opening being located in said down draft baffle walls at said normal liquid surface elevation for enabling removal of excess grease accumulation in said down draft annular space.

13. The apparatus of claim 1 wherein said aeration means includes an air diffuser drop assembly having a plurality of air diffuser bodies connected to a compressed air conduit.

14. The apparatus of claim 1 wherein said grease removal means is disposed in cooperating relationship to at least one of said tank walls for transporting grease at said normal liquid surface elevation out of said tank.

15. The apparatus of claim 1 wherein said tank has approximately square horizontal cross-sections about a central axis, said tank having four vertical planar side walls, and said tank further having four planar bottom walls sloping downwardly and inwardly from bottom edges of said side walls to a central lower portion about said central axis for collecting grit.

16. Apparatus for removing grit and grease from sewage, comprising:
a tank having walls;
grit removal means disposed in said tank for transporting grit out of said tank;
a sewage inlet conduit extending into said tank for transporting sewage into said tank, said sewage inlet conduit terminating at an open end within said tank;
a mixing eductor having a lower end disposed to receive sewage from said sewage inlet conduit, and said mixing eductor having an open upper end vertically located above said mixing eductor lower end;
aeration means within said mixing eductor and vertically located between said mixing eductor lower and upper ends for agitating and transporting said sewage upwardly within said mixing eductor;
a down draft baffle greater in dimension than said mixing eductor walls and disposed to define a down draft annular space between said down draft baffle and said mixing eductor, and said down draft baffle having an upper portion disposed to receive aerated sewage from said mixing eductor upper end;
said tank having a volume about said down draft baffle sufficient for settling substantially all grit from said sewage and floating substantially all grease from said sewage;
effluent removing mean for removing substantially grit and grease free effluent from said tank; and
grease removal means for transporting grease out of said tank; and wherein said effluent removing means comprises a baffle fixed to one of said tank walls and having an opening located approximately midway below a normal liquid surface elevation for receiving substantially grit and grease free effluent.

17. Apparatus for removing grit and grease from sewage, comprising:
a tank having approximately square horizontal cross-sections about a central axis, said tank having four vertical planar side walls, and said tank further having four planar bottom walls sloping downwardly and inwardly from bottom edges of said side walls to a central lower portion about said central axis for collecting grit;
grit removal means disposed in said tank central lower portion for transporting grit out of said tank;
a sewage inlet conduit extending upwardly from said tank central lower portion for transporting sewage into said tank, said sewage inlet conduit terminating at an open upper end vertically located at an elevation approximately corresponding to said tank side wall bottom edges, such that incoming sewage is ejected vertically into said tank along said central axis;
a tubular mixing eductor coaxial with said central axis and having a lower open end vertically located at an elevation below said sewage inlet conduit open upper end, said mixing eductor lower end having an opening greater in dimension than said sewage inlet conduit to define a recycle annular space between said mixing eductor and said sewage inlet conduit, and said mixing eductor having an open upper end vertically located at an elevation below a normal liquid surface elevation;
an air diffuser drop assembly suspended within said mixing eductor at an elevation above said mixing eductor lower end, said air diffuser drop assembly having a plurality of air diffuser bodies connected to a compressed air conduit for agitating and transporting said sewage upwardly within said mixing eductor;
a deflector baffle fixed above said mixing eductor upper end, said deflector baffle having a downwardly and outwardly sloping frustroconical wall central with said central axis, said frustroconical wall being disposed to downwardly deflect aerated sewage ejected from said mixing eductor upper end;

a tubular down draft baffle coaxial with said central axis and having a lower open end vertically located at an elevation approximately corresponding to said mixing eductor lower end, said down draft baffle lower end having an opening greater in dimension than said mixing eductor lower end to define a down draft annular space between said down draft baffle and said mixing eductor, and said down draft baffle having walls extending above said normal liquid surface elevation to contain aerated sewage for downward flow, and with at least one grease outlet opening being located in said down draft baffle walls at said normal liquid surface elevation for enabling removal of excess grease accumulation in said down draft annular space;

said tank having a volume about said down draft baffle sufficient for settling substantially all grit from said sewage and floating substantially all grease from said sewage;

an effluent scum baffle fixed to one of said tank walls and having an opening located approximately midway below said normal liquid surface elevation for receiving substantially grit and grease free effluent; and grease removal means disposed in cooperating relationship to at least one of said tank walls for transporting grease at said normal liquid surface elevation out of said tank.

* * * * *